(12) United States Patent
Thompson

(10) Patent No.: US 7,458,479 B1
(45) Date of Patent: Dec. 2, 2008

(54) DECORATIVE ELECTRICAL OUTLET COVER

(76) Inventor: Kimberly A. Thompson, 29108 N. 122nd Dr., Peoria, AZ (US) 85383

( * ) Notice: Subject to any disclaimer, the term of this patent is extended or adjusted under 35 U.S.C. 154(b) by 0 days.

(21) Appl. No.: 11/215,915

(22) Filed: Aug. 30, 2005

(51) Int. Cl.
*H02G 3/14* (2006.01)
*H02G 3/08* (2006.01)
*B65D 51/18* (2006.01)

(52) U.S. Cl. ............ 220/242; 220/3.8; 220/254.3; D8/351

(58) Field of Classification Search ............ 220/242, 220/241, 3.8, 3.3, 3.94, 254.3; D8/353, 351, D8/352, 350
See application file for complete search history.

(56) References Cited

U.S. PATENT DOCUMENTS

| | | | | | |
|---|---|---|---|---|---|
| 2,515,820 | A | * | 7/1950 | Clark | 40/542 |
| 2,712,582 | A | * | 7/1955 | Peretti | 200/330 |
| D189,351 | S | * | 11/1960 | Story | D8/351 |
| 3,825,710 | A | * | 7/1974 | Roberts et al. | 200/331 |
| 3,840,692 | A | | 10/1974 | Wells | |
| 3,953,933 | A | * | 5/1976 | Goldstein | 40/642.02 |
| D264,425 | S | * | 5/1982 | Nippel et al. | D8/351 |
| 4,513,877 | A | * | 4/1985 | Taguchi et al. | 220/830 |
| 4,740,655 | A | * | 4/1988 | Ford | 174/67 |
| 4,760,215 | A | * | 7/1988 | Cook et al. | 174/67 |
| 4,780,573 | A | * | 10/1988 | Own | 174/66 |
| D307,538 | S | * | 5/1990 | Tyree | D8/351 |
| D308,814 | S | * | 6/1990 | Kintigos et al. | D8/351 |
| 4,999,465 | A | * | 3/1991 | Kuhlman et al. | 200/308 |
| 5,099,087 | A | * | 3/1992 | Barrell | 174/66 |
| 5,603,178 | A | | 2/1997 | Morrison | |
| 5,675,126 | A | * | 10/1997 | Halvorsen | 174/67 |
| 6,031,183 | A | * | 2/2000 | Guerrieri | 174/67 |
| 6,037,542 | A | * | 3/2000 | McCall | 174/66 |
| 6,355,885 | B1 | * | 3/2002 | Rintz et al. | 174/66 |
| 6,547,589 | B2 | | 4/2003 | Magyar et al. | |
| 6,610,927 | B2 | * | 8/2003 | Dinh et al. | 174/66 |
| 6,761,582 | B1 | | 7/2004 | Shotey et al. | |
| 6,805,581 | B2 | | 10/2004 | Love | |
| D508,896 | S | * | 8/2005 | Nipke | D13/156 |

OTHER PUBLICATIONS

"Safety 1st Plug 'N Outlet Covers", from website: http://www.babyuniverse.com/pro.asp?store=baby&lang=&id=5231, 2005.

(Continued)

*Primary Examiner*—Anthony D Stashick
*Assistant Examiner*—Niki M. Eloshway
(74) *Attorney, Agent, or Firm*—Louis J. Hoffman; Edwin A. Suominen

(57) ABSTRACT

A disclosed apparatus mounts to a wall over a standard electrical outlet and decoratively conceals electrical receptacles of the outlet with a cover that can hingedly connect to the base. The base has a number of holes that conform to the outlines of a standard electrical outlet's receptacles, which can permit electrical plugs to access the receptacles' sockets when the base is mounted to the outlet. The cover can open away from the base to expose the receptacles, through the holes in the base, and can close against the base to conceal the receptacles. Together with the base, the cover establishes a decorative theme that is visually distinct from the electrical outlet and its receptacles.

25 Claims, 13 Drawing Sheets

OTHER PUBLICATIONS

TayMac CorporationProduct Catalog (2004 ed.) Obtained from the Internet Archive at: http://web.archive.org/web/20040221145910/http://taymac.com/taymac/completecatalog.pdf.

"Gang Duplex Receptacle Cover", from website: http://doityourself.com/store/6729982.htm, 2004.

"Summer Sunflowers, single outlet", from website: http://www.edirecthardware.com/cig-bin/edhcatalog.pl?a=di&did=425-OT281, 2004.

"Motion-Activated, Decorative Power Strip", from website: http://todays-deals.com/christmas-indoor-lightning.html, 2003.

Outlet Covers FAQ by LectraLock, from website: http://lectralock.com/outlet-covers-faq-htm.

"Darlene's Designs Decorative Switchplates", from website: http://www.switchplatedesigns.com/categories/sports.html.

"Royal Baby Safety Online Catalog", from website: http://www.babysafe.com/electric.htm.

"Baby Protectors: Electrical Protection Devices", from website: http://www.babypro.com/electric.html.

"Decorated Duplex & Quad Outlet Covers", from website: http://www.irasperipheralvisions.com/outlet_covers.htm.

"Outdoor Power Rock", from Silvo Home & Garden website: http://shop.silvo.com/product-12345/2/202/2024/subcategory/html.

"Snowman Family Power Center", from website: http://www.pasternackstruevalue.com/snfapoce.html.

"Christmas Cottage Wall Adapter", from website: http://www.pasternackstruevalue.com/chcowaad.html.

"Santa Claus Adapter", from website: http://www.pasternackstruevalue.com/saclad.html.

"Safety Outlet Covers", from website: http://improvementscatalog.com/home/improvements/1632....

"Decorative Outlet Covers", from website: http:/www.carrotpatchcrafts.com/plugcovers4_001.htm.

Bell Outdoor product info on Specialty Boxes and Covers, "Rayntite II" Single-Gang Weatherproof-While-In-Use Covers Polycarbonate, and Single-Gang Covers and Mini-Plate.

* cited by examiner

US 7,458,479 B1

DECORATIVE ELECTRICAL OUTLET COVER

BACKGROUND OF THE INVENTION

Exposed sockets of electrical outlets can present a safety hazard. Curious young children can be tempted to try poking conductive objects into the receptacles of the sockets. In outdoor installations that are exposed to rainfall, water can create paths of electrical conductivity from the receptacles to surrounding surfaces, which can cause shocks to those touching the surfaces. As a result, different types of covers for electrical outlets have been designed.

Some electrical outlet covers have attempted to address child safety or waterproofing concerns with a cover or pair of covers hinged to a baseplate. Some covers have depth so that they can snap over a cord that is plugged into one of the outlet's receptacles, enclosing both a plug at the end of the cord and the receptacle. Some homeowners have placed wallpaper or paint on outlet baseplates, even if not covered. However, existing outlet covers have very limited decorative aspects. Embossed logos are sometimes included on outlet plates or covers, although not for decorative purposes.

Meanwhile, home decoration is a major business. Decorators, interior designers, and homeowners prefer to obscure or downplay visually functional features such as conventional outlets, particularly those not in use. Decoration of child rooms is particularly popular. The need remains, accordingly, for ways to achieve the advantages of enclosed electrical outlets while decorating them in visually distinctive ways.

SUMMARY OF THE INVENTION

An apparatus for decoratively concealing electrical receptacles according to various aspects of the present invention includes a base and a cover hinged or otherwise coupled to the base. The base has a number of holes that conform to the outlines of a standard electrical outlet's receptacles, and can permit electrical plugs to access the receptacles' sockets when the base is mounted to the outlet. The cover can open away from the base to expose the receptacles, through the holes in the base, and can close against the base to conceal the receptacles. Together with the base, the cover establishes a decorative theme that is visually distinct from the electrical outlet and its receptacles.

According to one particular aspect of the invention, the cover can include a tray that is structured to receive a standard ceramic tile. When mounted in the cover, such a tile attractively conforms to the appearance of similar surrounding tiles. In another aspect, the cover can have relief design features. The cover and base combination can have substantial three-dimensional aspects.

According to other particular aspects of the invention, the base can be substantially flat and, with the cover, establish a visually distinctive decorative theme. The cover takes the form of a cover flap, possibly hinge-mounted, containing design features contributing to the overall theme. The base and cover can be designed in a substantially non-rectangular shape, to assist in avoiding visual correspondence with the electrical outlet and its receptacles.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims. Such combinations have particular advantages not specifically recited in the above summary.

DESCRIPTION OF PREFERRED EXEMPLARY EMBODIMENTS

Decorative outlet cover devices according to various aspects of the present invention conceal and enclose electrical receptacles behind cover doors, flaps, or other portions in aesthetically pleasing, conveniently accessible ways. Several particularly advantageous embodiments of the invention are discussed below with reference to the drawings. The embodiments each include a base having a number of holes (typically two or four) conforming to the truncated-circle outlines of receptacles found on a standard electrical outlet, to which a decorative cover is hinged or releasably attached.

In advantageous embodiments, the base and cover together establish a visually distinctive decorative theme. Such a theme has an appearance readily recognizable to the average observer. By being visually distinct as well as merely decorative, the theme removes the viewer's focus from the device's mere concealment and enclosure of an electrical outlet and imparts its own attractive appearance to the device. In some embodiments, the device's attractive appearance is intended to be unique to its setting and memorable in its own right. In other embodiments, the attractive appearance can be distinct from the unsightly electrical outlet it is concealing but blend in with other surrounding decorative aspects of a room.

Figure 2:
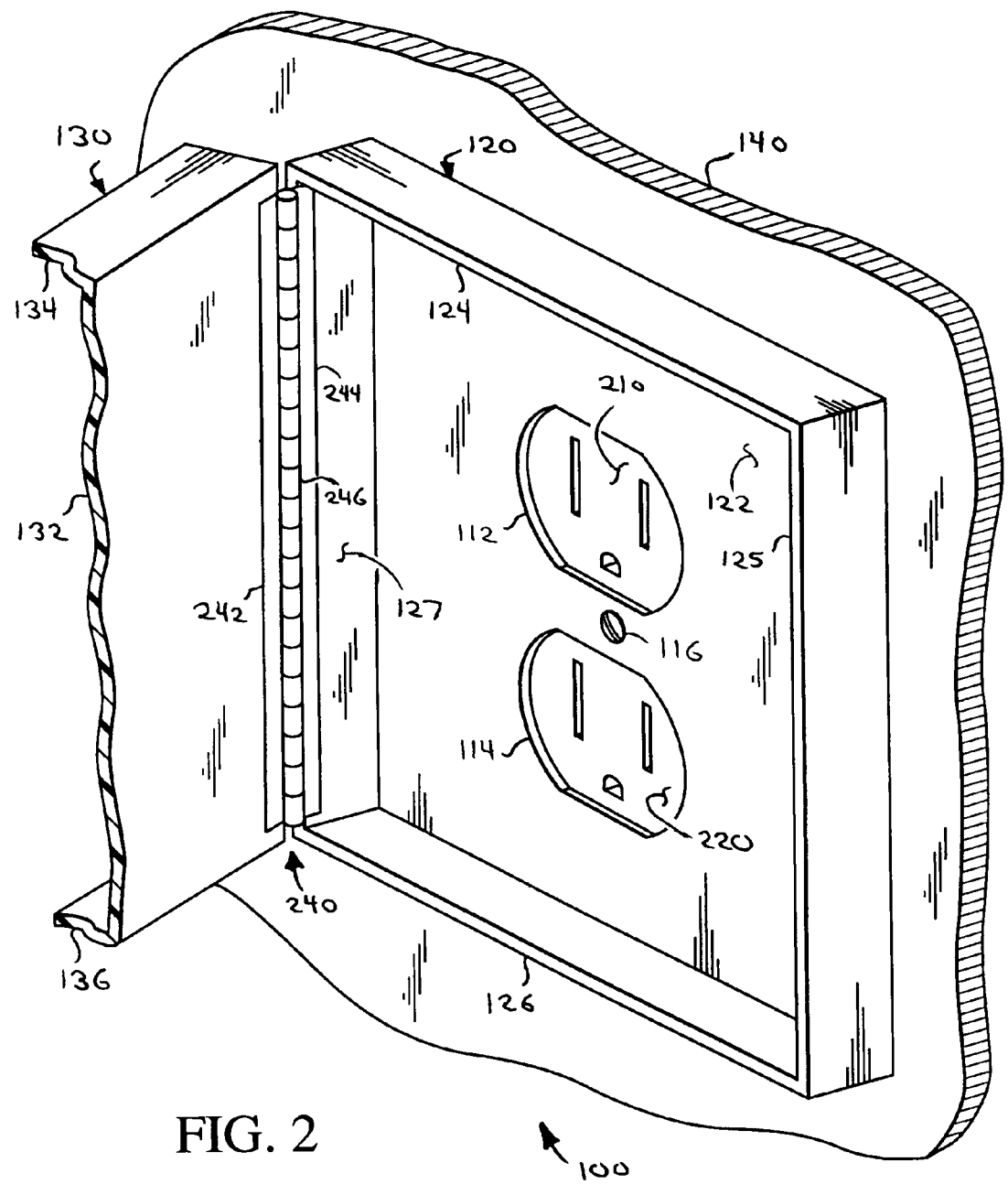
Figure 3:
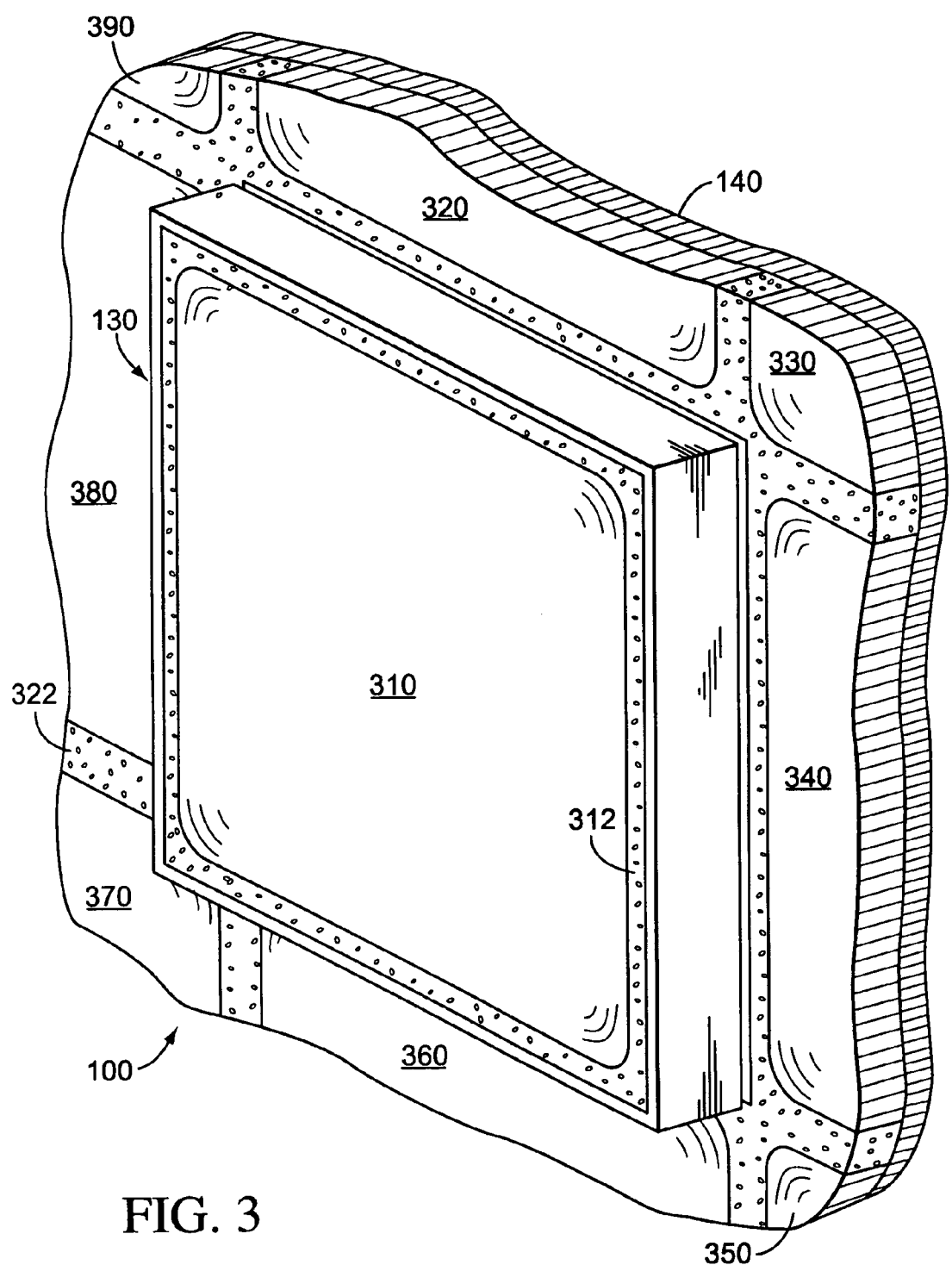

FIG. 3 illustrates an example of the latter case, an outlet cover device 100 in accordance with various aspects of the invention that is mounted to a wall 140 to which ceramic tiles 320-390 are attached. Advantageously, device 100 in turn mounts a ceramic tile 310 and thus blends in with wall 140 rather than advertising its presence and the electrical outlet it is concealing. Device 100 includes a base 120 and a tray-like cover 130 connected to base 120 via a hinge 240 (FIG. 2) and receives ceramic tile 310.

Hinge 120 may have various forms of known types aside from the entire-length spring shown in FIG. 2. In one embodiment, hinge 120 biases cover 130 against base 120, so that it springs shut when released. Alternatively, the hinge structure may have a notch or other structure so that cover 130 remains fully open after being opened without being held open by a person, yet where it springs firmly shut when the person pushes cover 130 slightly away from the fully open position.

In yet another alternative, the hinge can have no bias at all, i.e., the hinge can be spring-loaded or not.

Hinges can be placed to allow cover 130 to open in any direction or angle, including up, down, left, right, or angled.

Additionally, the device may include a suitable type of latching mechanism, such as a magnet-metal pair, a hook-eye pair, or a pressure catch (none shown). Such structures allow cover 130 to remain firmly closed against base 120 when fully closed without working open.

Base 120 has four side walls 124, 125, 126, 127 of substantially similar length and width, which are arranged around a back wall 122 and give base 120 a size and shape similar to that of a standard four-inch wide (or, in a variation, six-inch wide) square ceramic tile. Cover 130 likewise has four side walls 134, 135, 136, 137 of similar dimensions. (In an alternative, the cover may be rectangular or another shape, instead of square.) With side walls 134-137 arranged around an openly accessible back wall 132, cover 130 forms a tray-like structure that can receive a decorative tile insert, in one embodiment a standard ceramic tile.

As illustrated in FIG. 3, such a tile insert 310 can be mounted into cover 130 with grout 312. Advantageously, tile insert 310 attractively conforms to the appearance of ceramic tiles 320-390 of like dimensions found on the wall or floor adjacent to the electrical outlet or otherwise blends with the building decor. Tile insert 310 can be patterned or a uniform color. Tile 310 alternatively can be formed of porcelain, glass, travertine, granite, wood, metal, or other suitable material.

In its back wall 122, base 120 has a pair of holes 112, 114 (FIG. 2) that conform to the outlines of a standard electrical outlet's receptacles 210, 220. (Exemplary receptacles 210, 220 are shown arranged one above the other, as is perhaps most common, but variations can be structured to accommodate receptacles that are arranged side by side instead.) Cover 130 can open away from base 120 to expose receptacles 210, 220, which are then accessible through holes 112, 114. Outlets 210, 220 can protrude slightly through holes 112, 114, be flush with surface 122, or be slightly recessed (as shown), depending on the type of outlet and how it is mounted in the wall. Holes 112, 114 can cover one receptacle each, or a larger hole might cover both (or two of many) receptacles. Holes 112, 114, in some embodiments, might be somewhat larger than the receptacles they cover. Thus, electrical plugs can access the sockets of receptacles 210, 220 when cover 130 is open and retracted from base 120, as illustrated in FIG. 2. When cover 130 is closed against base 120 (FIG. 3), cover 130 attractively conceals receptacles 210, 220 and a viewer sees only ceramic tile 310 and side walls 134-137 of cover 130, slightly protruding from wall 140 and surrounded by ceramic tiles 320-390 that are conventionally mounted on it. Accordingly, receptacles 210, 220 become less prominent visually, which has benefits for decoration and interior design.

Base 120 further includes in its back wall 122 a hole 116 that is sized to receive a standard base-plate screw for an electrical outlet. Base 120 secures to wall 140 over the electrical outlet of receptacles 210, 220 by friction between the back side (not shown) of the base's back wall 122 and wall 140, which is maintained by tension on the screw in hole 116. Alternative ways of securing base 120 near the receptacles include fasteners near the edges of plate 122, glues, or prongs engaging one of receptacles 210, 220.

The dimensions of an outlet cover device's various structural elements can be suited to the desired implementation. Exemplary device 100 has suitable dimensions for concealing a standard dual-receptacle (single-duplex) electrical outlet behind a four-inch, square tile insert 310. In one of many possible variations, such a device can have a cover dimensioned to receive a six-inch square tile with a suitable amount of grout-filled border space, which can be employed to cover an electrical outlet with four receptacles arranged in a 2×2 array (double duplex).

Aside from the most common outlets, covers can be designed with holes appropriate for other outlet configurations, including generally round receptacles for high-voltage lines, small rectangular holes to accommodate switches, larger rectangular holes for GFCI outlet pairs, and combinations of duplex, GFCI, and round outlets. The term "standard" in connection with outlets refers to designs known as standard now and those that become standard in the future.

Particularly for embodiments including tile inserts 310, the weight of the tile can make it preferred to allow for additional fasteners (aside from central screw hole 116) to secure the cover firmly to the wall. The weight of tile inserts 310 can make it preferred to avoid spring-loaded hinges.

A double-duplex outlet cover as disclosed can be designed for use with either single-duplex or double-duplex outlets, because the cover will nonetheless cover both sets of holes even if only one has outlets protruding through it. In a variation, one or both pairs of holes for outlets in a double-duplex outlet cover can be outlined with perforations, allowing the user to create the holes by punching out a blank of materials at the desired location or locations, depending on which set of holes would be best used for a single duplex outlet or whether the cover is being used for a double-duplex outlet.

In another variation, more than one tile may be included in the tray-like structure of cover 130, such as four one-inch-square tiles forming a window-like pattern, or many very small, differently shaped tiles forming a mosaic pattern, with appropriate grout between the tiles and mounting the tiles to the cover 130. None of these alternatives are shown in the drawings.

Tile inserts 310 can be formed of standard size or of unusual sizes. Tile inserts 310, or for that matter the cover 130, need not correspond in size or orientation with the outlet shape. For example, one embodiment (not shown) uses a square cover supporting a square tile insert 310, both of which are arranged at a 45-degree angle from the outlet, so that the tile gives the appearance of a diamond shape, nevertheless large enough to cover even the corners of the outlet.

Advantageously, a continuous (or partial) lip or recess (not shown) can be included in base 120 along the inner sides of walls 124-127. Such a lip or recess can fit against a complementary profile (not shown) on the back of cover 130. A suitably snug fit therebetween can allow a press-fitted connection can be obtained between base 120 and cover 130, helping to seat the cover more securely and consistently. Where desired, the press-fitted connection can eliminate any need for a latching mechanism to hold base 120 and cover 130 in a closed position. Where a latching mechanism remains desirable even with a lip, part of that mechanism can be mounted to or made part of the lip.

Another benefit of providing a lip on the base of an outlet cover device according to various aspects of the invention is the prevention of dust and other undesirable material from entering the closed space formed between the device's cover and base when in a closed position. Where an especially snug fit or watertight seal is desired, a gasket of rubber or other suitably elastic material can be employed at the base-cover interface in addition to, or instead of, a lip on the base. As with the lip, such a gasket can be made part of or mounted to the cover rather than the base.

FIGS. 4-11 illustrate various outlet cover devices 400, 600, 800, 1000 that employ substantially flat bases and cover flaps (which can be hinge-mounted) that form visually distinctive, integrated decorative themes. The paragraphs that follow discuss ways in which the base and cover flap together contain or embody a visual depiction of a structure, scene, plant, creature, object, etc. As may be better understood with reference to FIGS. 4-5, for example, one such device 400 includes a base 420 comprised of thin strips of material that are shaped and arranged to resemble a medieval castle. In the case of device 400, the visually distinctive theme is a somewhat stylized rendering of a widely recognized structure or building type, with the cover preferably hinge-mounted and showing the door or portal allowing entry to the structure.

Many variations of building types can be employed instead of the illustrated example, including a log cabin, a country cottage, and various kinds of houses. Instead of a building type, the structure depicted can be a transportation device, such as an airplane, rocket ship, car, truck, fire truck, ambulance, or bus, again with the cover displaying the door or a door. Alternatively, the cover can display a part of the structure that is not a door, such as a roof, a castle turret, a dormer window, or an airplane wing. The cover also can display a part of a scene containing a structure, such as one of several buildings forming a skyline, a barn that is part of a farm scene, a school bus in front of a school building, a fire station with fire trucks outside, and so forth.

This set of embodiments, whatever they display, has the common aspect that the base and the cover each have decorative features, different from each other, that together form a common decorative theme.

Figure 4:
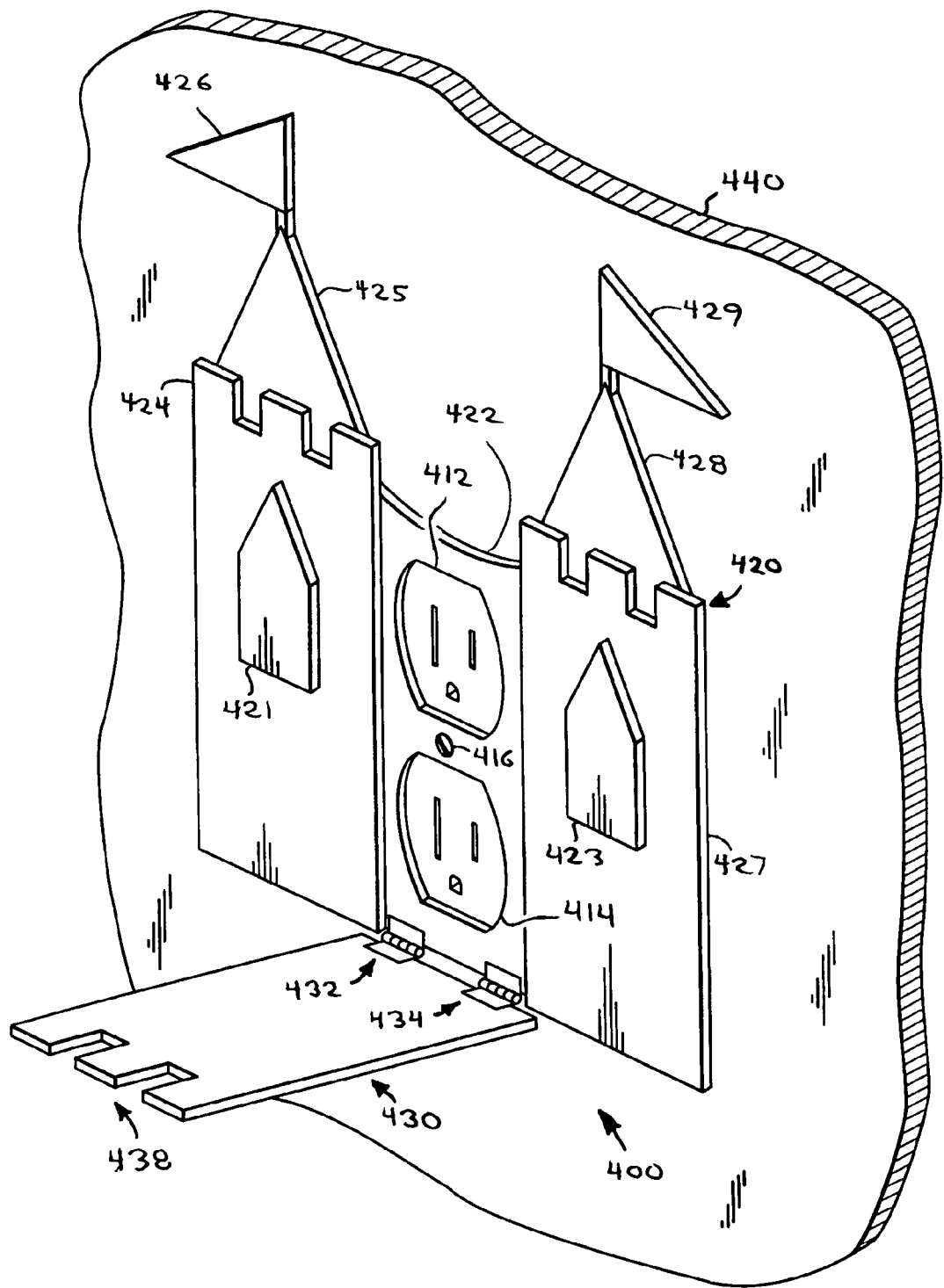
FIGS. 4-5 are perspective views of an outlet cover device configured to resemble a castle with its drawbridge as a hinged cover flap.
Figure 5:
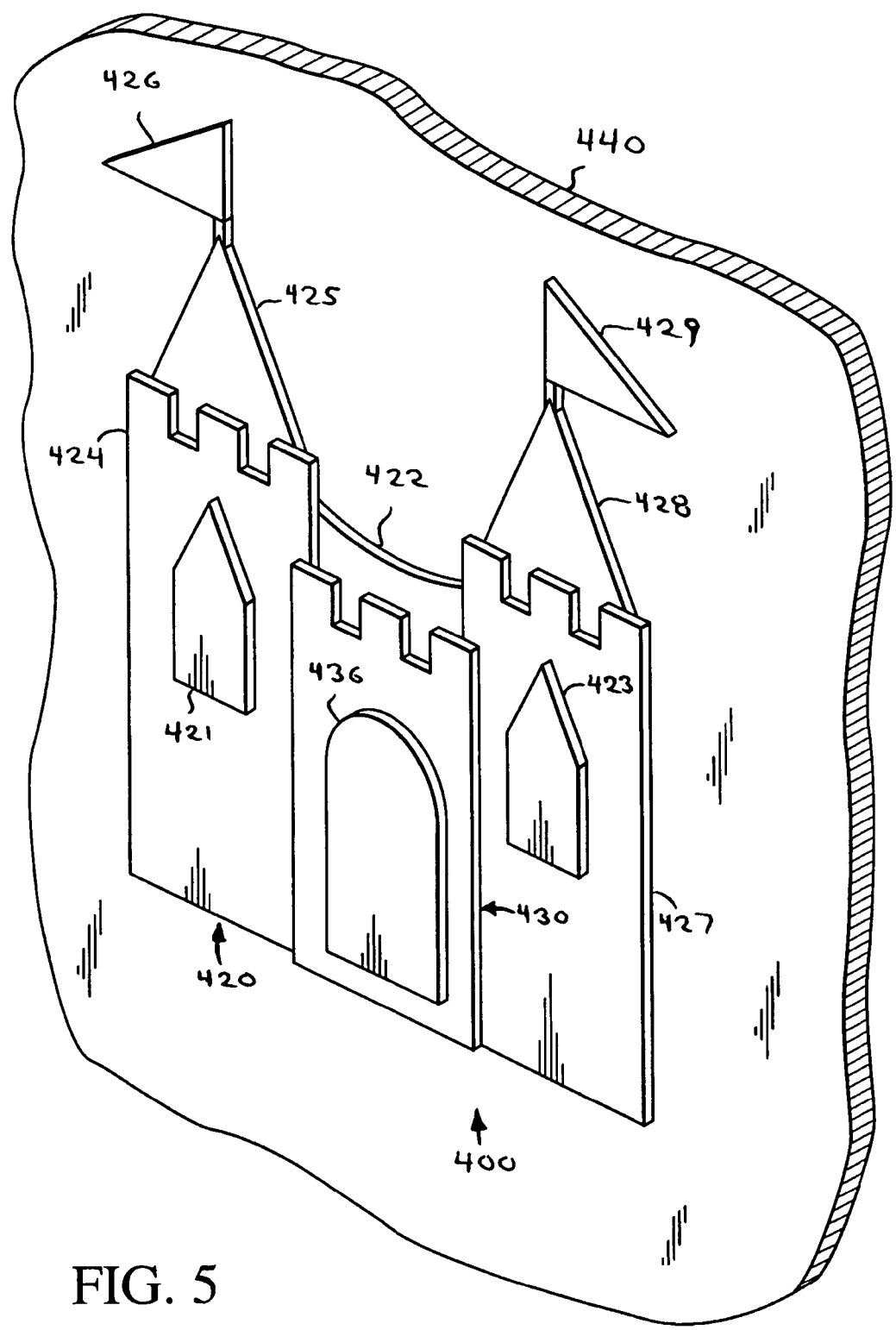

As illustrated in the open and closed views of FIGS. 4-5, base 420 includes a pair of electrical receptacle holes 412, 414 and a mounting hole 416 like receptacle holes 112, 114 and mounting hole 116 of base 120 (FIG. 2). Material of base 420 surrounding holes 412, 414 assists in establishing the visually distinctive common decorative theme with decorative features such as parapet-topped walls 424, 427 having windows 421, 423 and towers 425, 428 on which stylized flags 426, 429 are mounted. Material of base 420 immediately surrounding holes 412, 414 is shaped to resemble a gate 422 between castle walls 424, 427.

The material employed in a base or cover flap according to various aspects of the invention can be appropriately colored or textured, or both. For example, the strips of material forming walls 424, 427 can have a gray color and bumps to resemble masonry stones. The strips of material forming windows 421, 423 can have a smooth texture and a dark gray or black color.

Device 400 also includes a cover flap 430 that resembles a castle drawbridge (or a central part of a castle containing a door) in several ways. Flap 430 has the rectangular shape of a drawbridge and is hinged to base 420, so that it appears generally similar to the way a real drawbridge might connect to a real castle gate. The similarity in this particular drawing is not exact because cover flap 430 includes parapets 438, which are a feature of a castle wall, not a drawbridge, but the decorative drawbridge appeal is to a large extent preserved nonetheless. A less abstract embodiment might look closer to a drawbridge of a real castle. In addition, the dimensions of flap 430 are of the same scale as base 420 in its representation of a medieval castle. Flap 430 also contains door-shaped feature 436.

Thus, overall, cover flap 430 advantageously contains design elements or features that, in combination with decorative features of base 420, form an identifiable, clearly recognizable common decorative theme.

As with base 420, color or texture (or both) of cover flap 430 can add visual appeal and conformance to the desired theme. For example, flap 430 includes a door 436 that is visible when flap 430 is closed (FIG. 5), which can have a brown, wood-grain appearance to resemble timbers or hewn boards.

Figure 6:
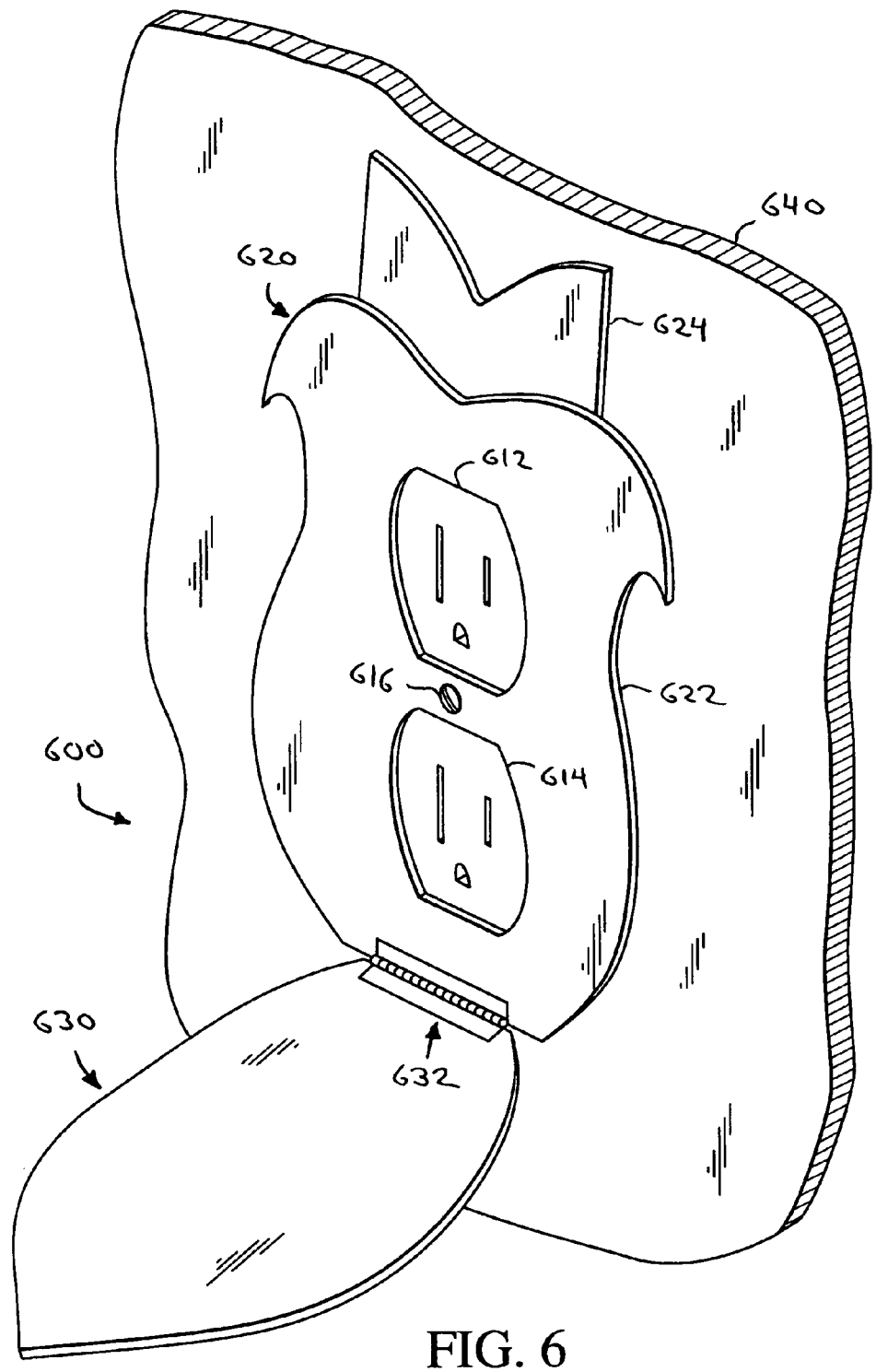
FIGS. 6-7 are perspective views of an outlet cover device configured to resemble a tulip with one of its petals as a hinged cover flap.
Figure 7:
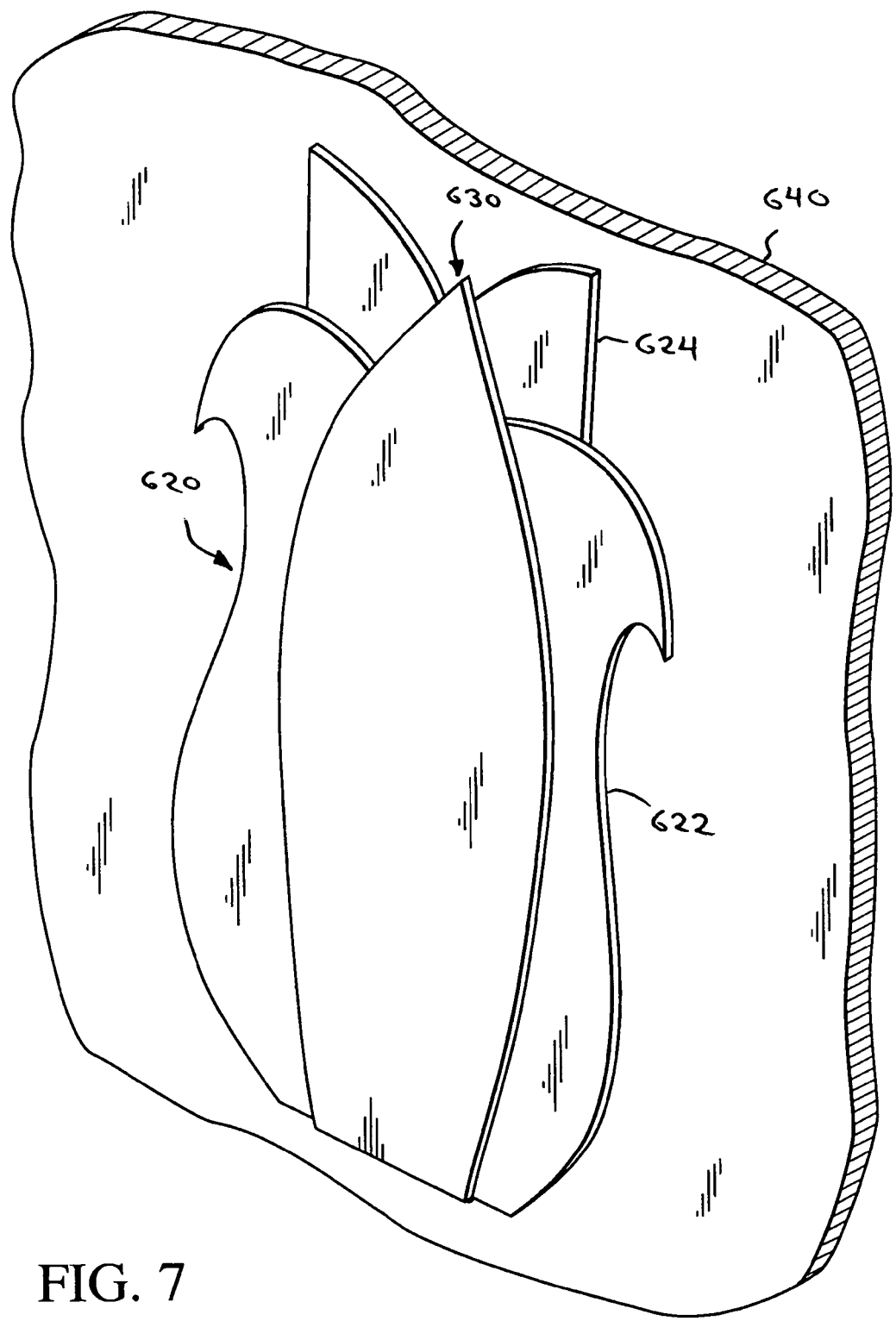

FIGS. 6-7 illustrate an outlet cover device 600 that establishes a visually distinctive decorative theme in the general category of an ornamental plant, more specifically a flower, rather than a structure or transportation device discussed above. Base 620 includes a large slab of material 622 with electrical receptacle holes 612, 614 and a central hole 616 for mounting base 620 to a wall 640. Slab 622 provides a stylized rendition of two petals of a tulip. Base 620 further includes a smaller slab of material 624 that provides a stylized rendition of two more petals of the tulip, located behind the petals of slab 622 from the intended viewpoint looking towards wall 640. A cover flap 630 of device 600, hinged to base 620, resembles another petal of the tulip in front of the petals of slabs 622, 624 of base 620. Thus, cover flap 630 conforms to the tulip theme together with base 620, with both flap and base bearing different decorative features.

Many variations of ornamental-plant or flower designs can be employed instead of the illustrated tulip, including a saguaro cactus with a cover flap resembling one of the cactus' arms, a blooming rose with a cover resembling one of the petals or, when opened, revealing the rose blooming, and so forth.

Figure 8:
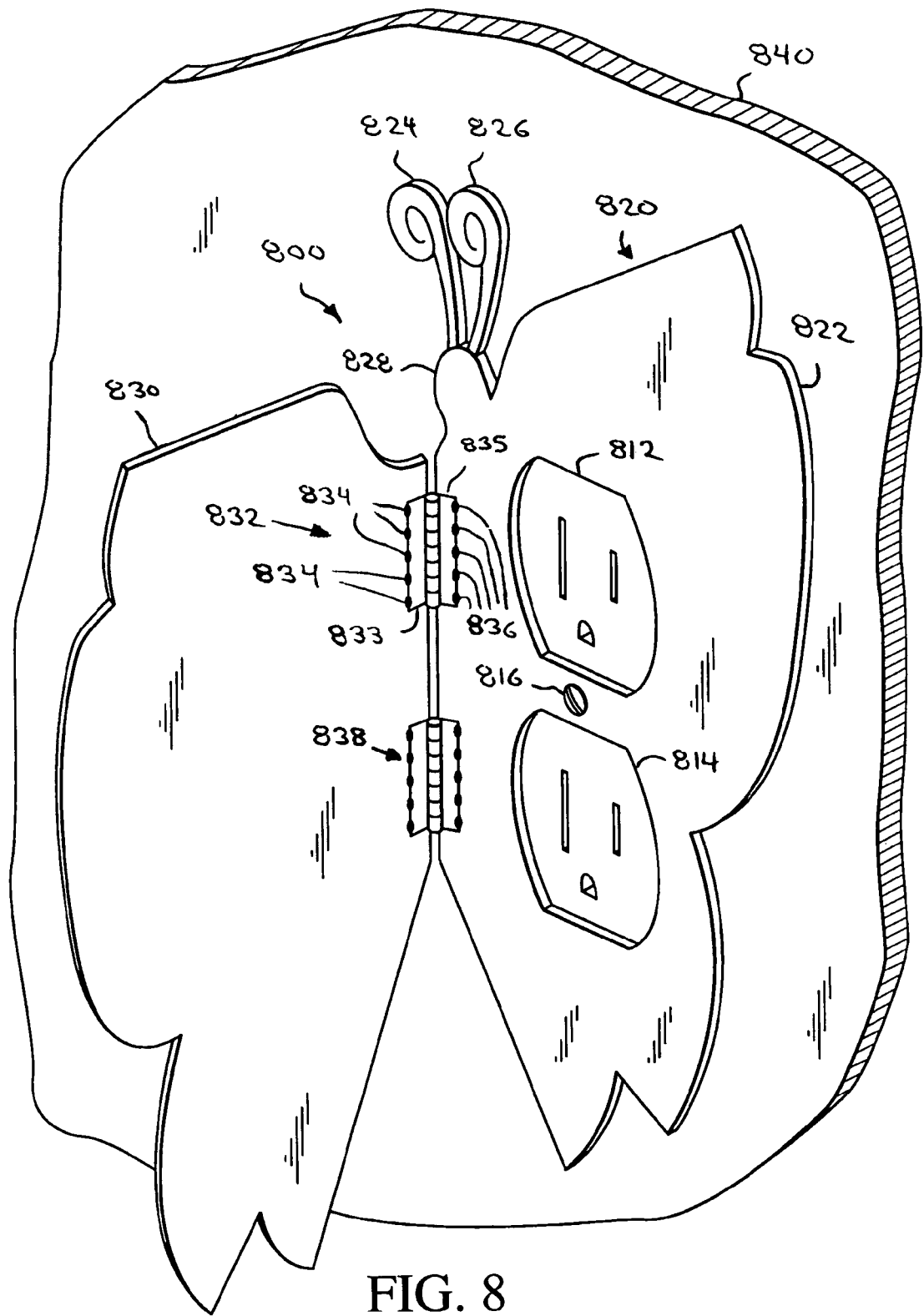
FIGS. 8-9 are perspective views of an outlet cover device configured to resemble a butterfly with one of its wings as a hinged cover flap.
Figure 9:
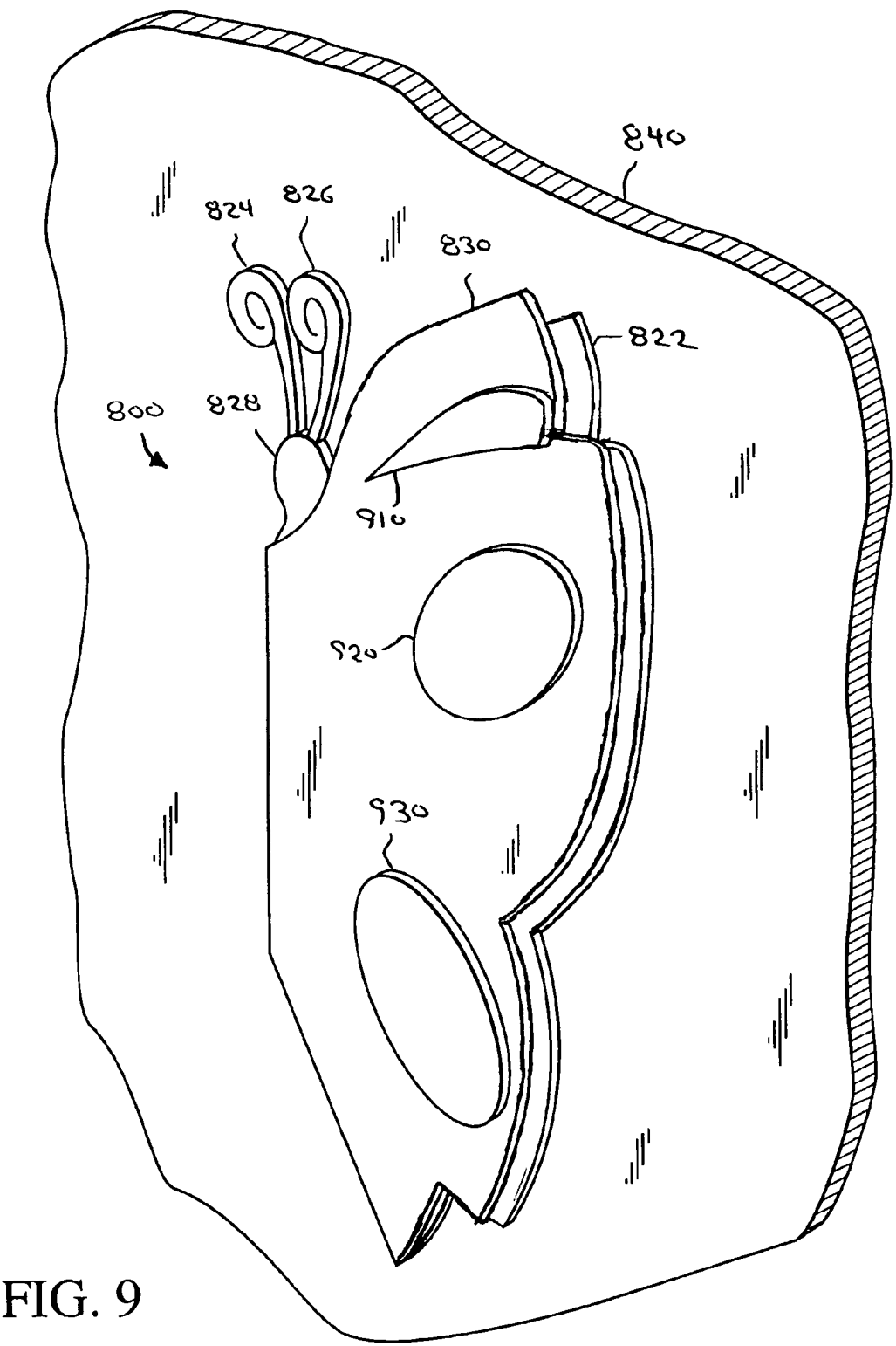

FIGS. 8-9 illustrate an outlet cover device 800 with a substantially flat base 820 that establishes the visually distinctive decorative theme of a winged creature, such as a butterfly, bird, or other insect. Base 820 includes a large slab of material 822 with electrical receptacle holes 812, 814 and a hole 816 for mounting base 820 to a wall 840. Slab 822 mostly provides a stylized rendition of one of a butterfly's two wings, with a portion 828 of slab 822 depicting the butterfly's head. Base 820 further includes small strips of material 824, 826 that provide a stylized rendition of the butterfly's antennae.

A cover flap 830 of device 800, hinged to base 820, resembles the other wing of the butterfly. Thus, cover flap 830 conforms to the butterfly theme with base 620. When cover flap 830 is closed against base 820, as shown in FIG. 9, shapes 920, 930 affixed to one side of flap 830 are revealed to the observer, providing the stylized appearance of spots on the depicted butterfly's wing. The device can be appropriately colored if desired.

Many variations can relate to other winged creatures, real, extinct, or imaginary, instead of the illustrated example, including a songbird with a cover flap resembling one of the bird's wings, a ladybug, a bumblebee, a flying dinosaur, and a flying dragon (perhaps with the cover resembling flames from the dragon's breath).

Figure 10:
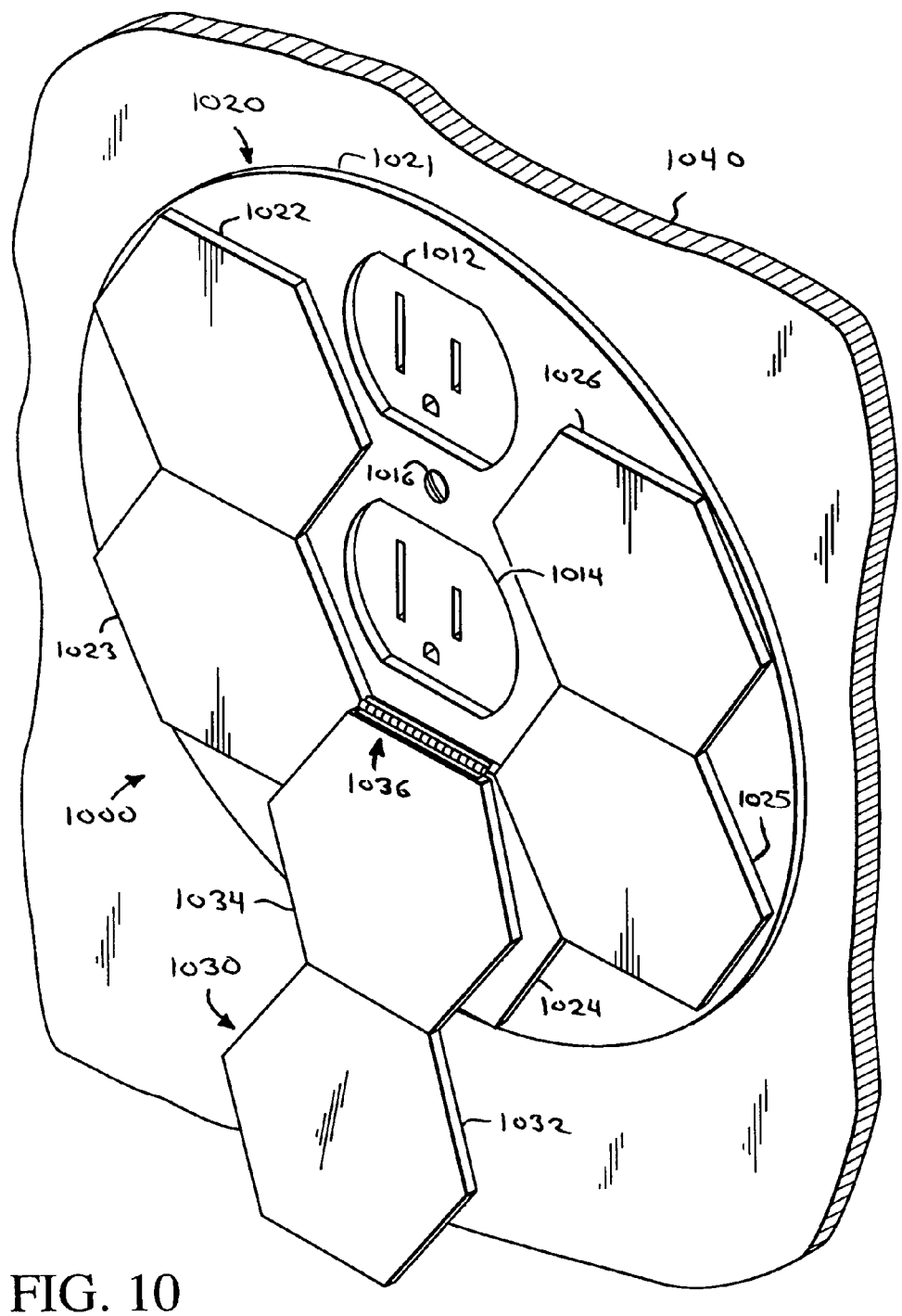
FIGS. 10-11 are perspective views of an outlet cover device configured to resemble a soccer ball with a pair of hexagonal sections as a hinged cover flap.
Figure 11:
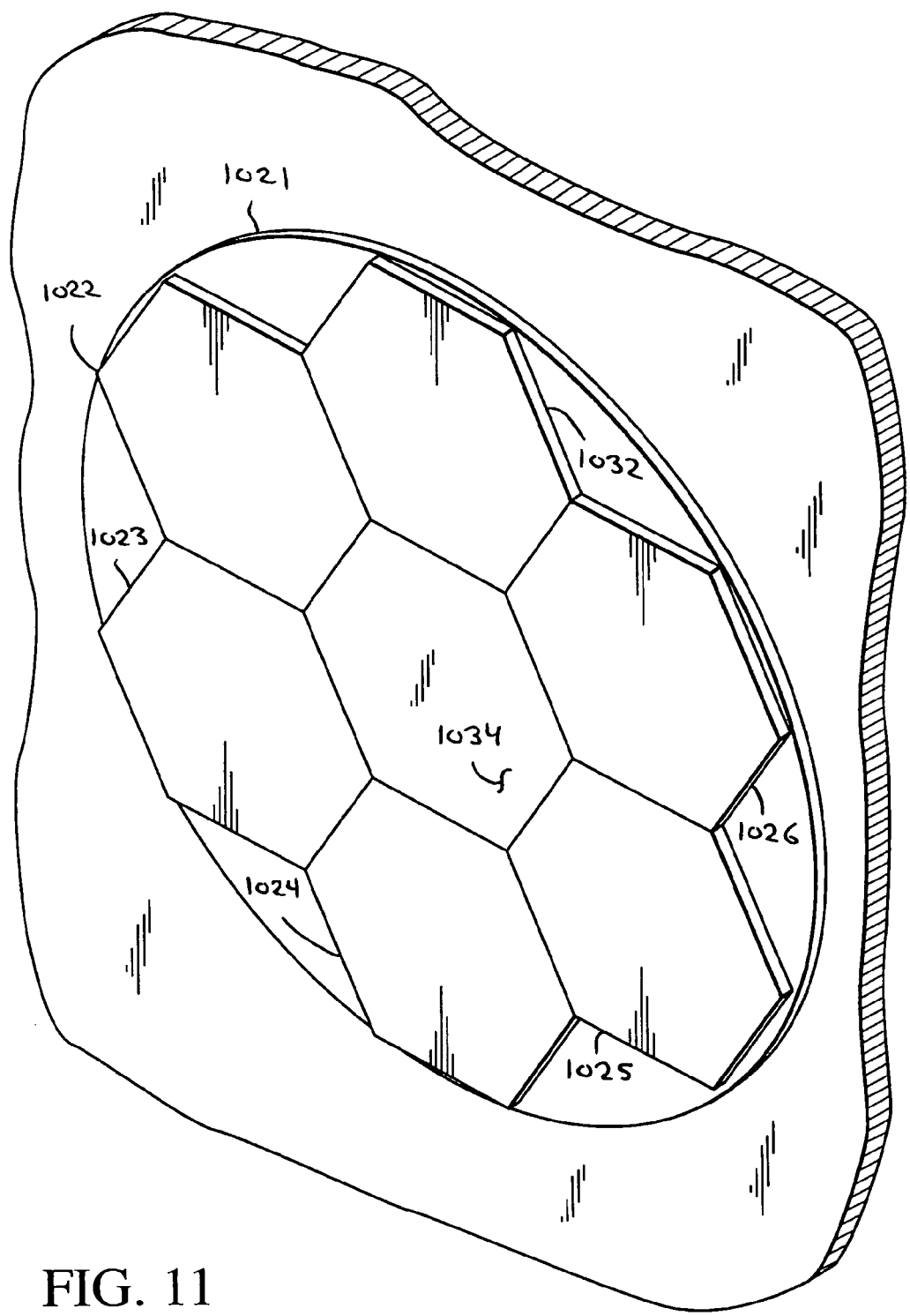

FIGS. 10-11 illustrate an outlet cover device 1000 with a substantially flat base 1020 that establishes a visually distinctive decorative sports theme, more specifically a soccer ball. Base 1020 includes a large slab of material 1021 that serves as a substrate for a number of hexagonal slabs 1022-1026. The arrangement of slabs 1022-1026 and the generally circular outline of slab 1021 provides a two-dimensional rendition of a soccer ball. Slab 1021 has electrical receptacle holes 1012, 1014 and a central hole 1016 for mounting base 1020 to a wall 1040. A cover flap 1030 of device 1000, hinged to base 1020, resembles two hexagonal parts of the depicted soccer ball. Alternatively, the cover flap can have one hexagonal section, three sections, or another number. Thus, cover flap 1030 conforms to the soccer-ball theme together with base 1020.

Many variations on the general sports theme can be employed instead of the illustrated example, including a football with a cover flap resembling a portion of the ball containing the laces, a baseball with an hourglass-shaped cover flap resembling a portion of the ball between stitches, a baseball and bat combination, a golf green scene containing a hole, flag, and golf ball, a gymnastics scene showing various equipment and gymnasts, a sports stadium, or images of particular players or teams.

Aside from the categories of themes having examples shown in the various embodiments, other themes can be utilized, such as food themes (ice cream cones, pasta, fish, corn, etc.), equipment themes (computers, televisions, stereos, etc.), employment themes (doctors, lawyers, engineers, etc.), location themes (national parks, cityscapes, forests, beaches, oceans, etc.), and so forth.

The base of an outlet cover device according to various aspects of the invention can be molded from a single piece of suitable material, e.g., plastic or assembled from different pieces of similar or different materials. A variety of embodiments shown in the figures depict base-cover combinations that together establish a substantially non-rectangular shape that is visually distinctive from the electrical outlet.

When a single piece of material forms the base, different parts of that piece can be given different appearances, e.g., by application of different inks or a laminated photographic pattern to the piece's surface. In a variation of device 400 of FIGS. 4-5, for example, base 420 can be fabricated from a single piece of material that depicts towers 425, 428, windows 421, 423 with different colored surface indicia rather than with different strips of material. In a variation of device 800, spots 920, 930 on cover flap 830 (FIG. 9) can be rendered by distinct surface coloring rather than by separate strips of material.

A cover and base of an outlet cover device according to various aspects of the invention can be made coupleable together by a hinge, as in the examples of devices 100, 400, 600, 800, 1000 discussed above. Any suitable type of hinge can be employed, and exemplary devices 100-1000 use hinges of several different types for illustration of that point. Hinge 240 of device 100 (FIG. 2) includes flanges 242, 244 that span nearly the entire length of walls 137, 127 of base 130 and cover 120, respectively. The configuration provides enough support to cover 130, via nearly four inches' length of pivot 246, to robustly handle the combined weight of cover 130, ceramic tile 310, and grout 312 (FIG. 3).

In other embodiments, such a strong hinged coupling could be considered overkill. In device 400 of FIGS. 4-5, for example, cover flap 430 connects to base 420 via two small hinges 432, 434. As shown in FIG. 9, cover flap 830 of device 800 also connects to base 820 via two small hinges 832, 838. In devices 600, 1000 of FIGS. 6-7, 10-11, cover flaps 630, 1030 connect to their respective bases 620, 1020 at a relatively short length of cover flap material. In those embodiments, hinge 632 (FIG. 6) and hinge 1036 (FIG. 10) are employed singly and spanning nearly all of that short length. There, the use of separate hinges would be unnecessarily complicated even though structural strains on lightweight cover flaps 630, 1030 are likely to be minimal.

Hinges can be attached at their flanges to a base and cover by any suitable technique. As may be better understood with reference to the example of FIG. 8, flanges 833, 835 of hinge 832 are spot-welded to the inner surfaces of cover flap 830 and base 820, respectively, at numerous locations 834, 836. Such welding can be plastic welding where a small amount of the joining materials is melted momentarily with a laser or other precision heating device. Other types of attachments such as adhesives, screws, and integral construction can be employed, and hinges of the other exemplary devices 100, 400, 600, 1000 discussed above are not illustrated with any particular attachment type in the drawings.

Figure 12:
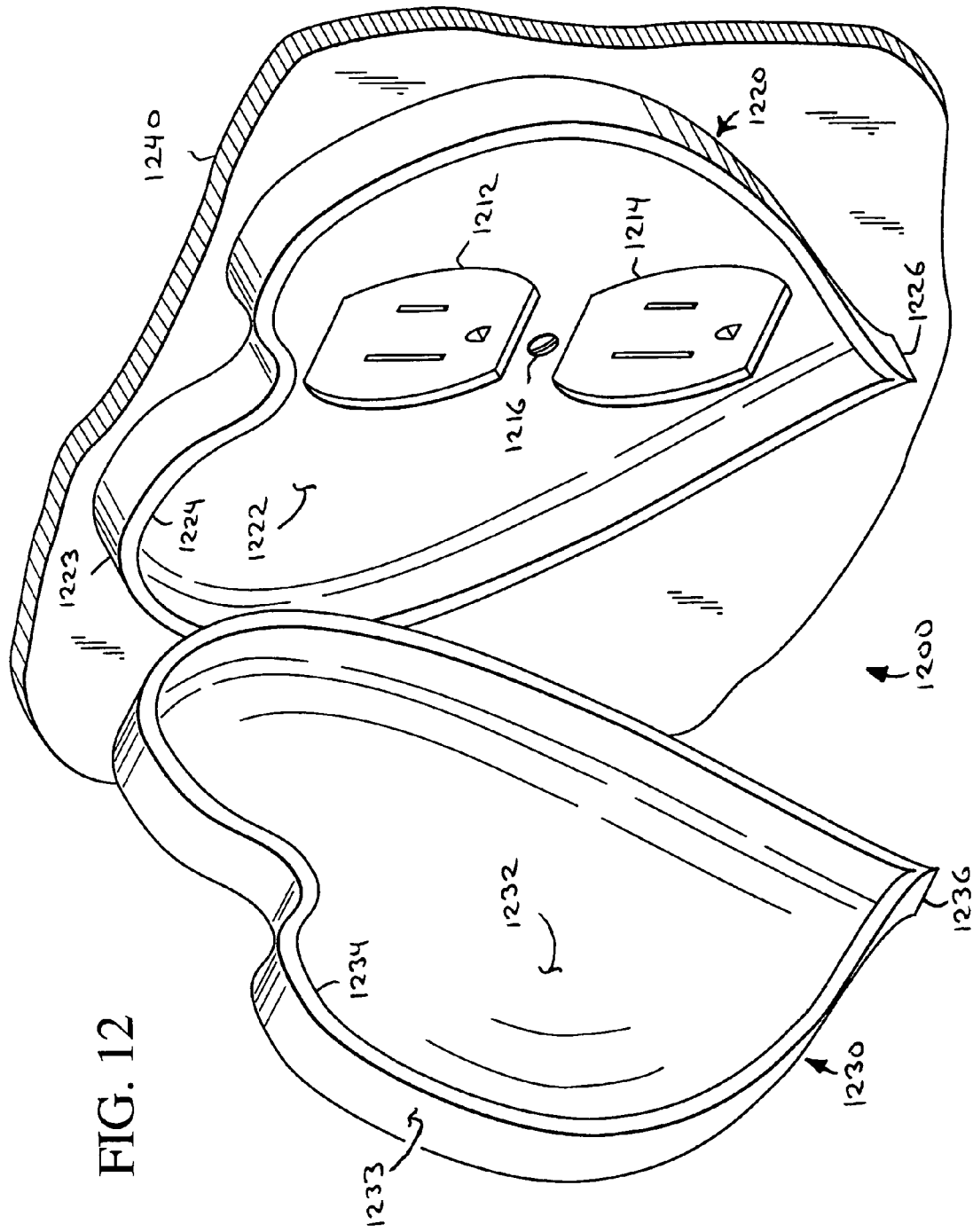
FIGS. 12-13 are perspective views of an outlet cover device configured to resemble a heart with a protuberant, removable front portion.
Figure 13:
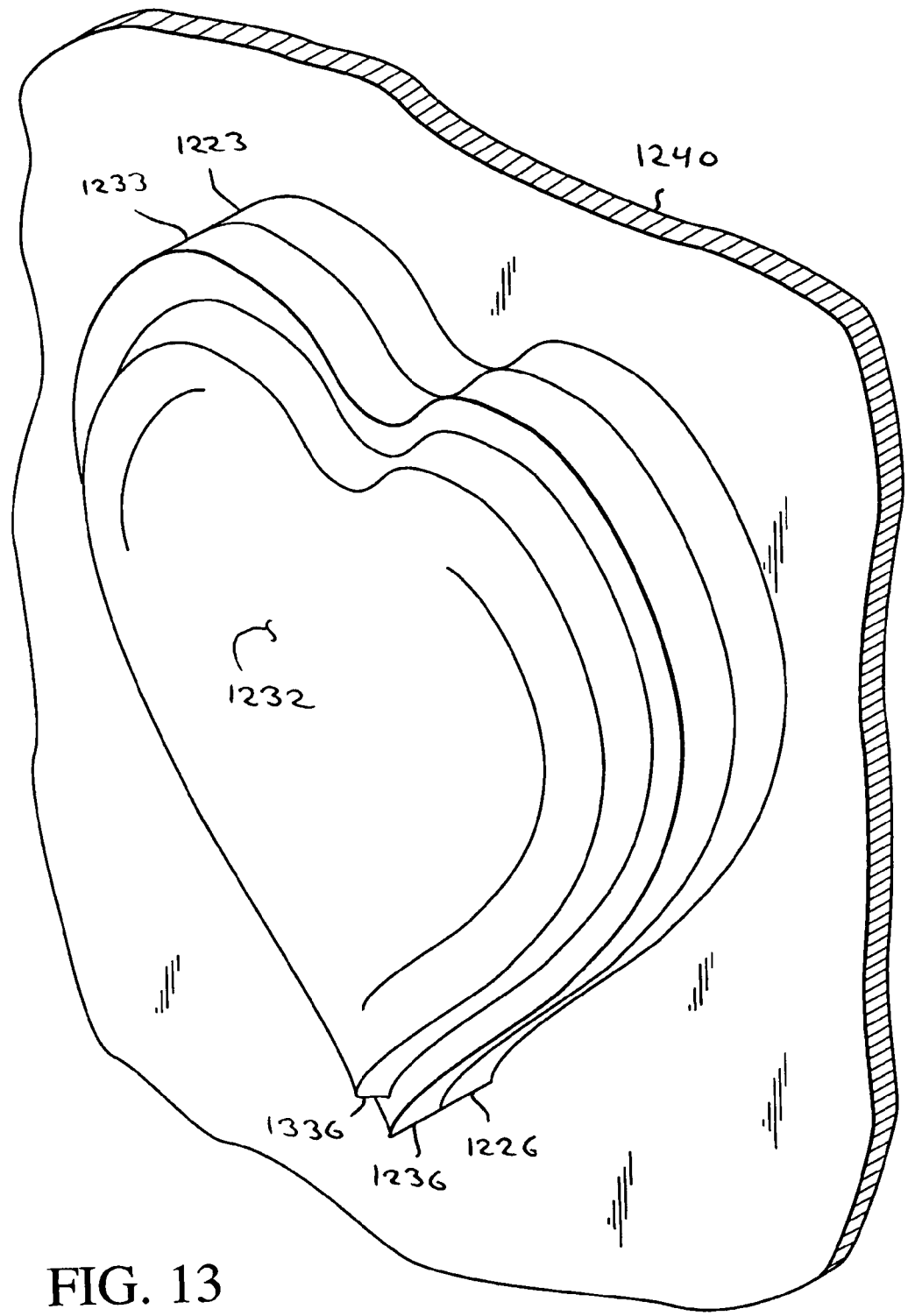

FIGS. 12-13 illustrate an outlet cover device 1200 including a base 1220 and a cover 1230 that are coupleable together with no hinge at all. Instead, cover 1230 and base 1220 are structured to releasably press-fit together. Snugly-fitting flanges (not shown) protrude slightly toward each other as they approach in the intended closed configuration, above a wall 1223 of base 1220 and below wall 1233 of cover 1230 (FIG. 12). With suitable flange materials and exactness of fit, friction between the flanges provides enough resistance to separation between cover 1230 and base 1220 when the two are connected that no other attaching structure is required. The lip or recess discussed previously can be used, if desired, to permit support of cover 1230 by base 1220.

Press-fitting in accordance with FIGS. 12-13 can be used with any of the designs shown in the other figures as well. Alternatively, the embodiment shown in FIGS. 12-13 can be modified to include a hinge, such as one (not shown) placed vertically at the side of one lobe of the heart. In a further variation (also not shown), cover 1230 can be split into two parts, with hinges at the side of each lobe of the heart, such that cover 1230 opens like a pair of doors from the central split. Any of the designs shown in the other figures can also have covers formed into two parts with two hinges.

Also, for double-duplex outlets, dual hinges can be used to have two separate covers, one for each pair or receptacles. In such instances, the two covers can each have decorative elements forming a common decorative theme with their common base.

Base 1220 and cover 1230 together establish a decorative, substantially non-rectangular shape that is visually distinctive from the electrical outlet. In exemplary device 1200, the shape is a stylized heart with substantially symmetrical curved left and right boundaries that meet on the bottom of the shape at a sharp point and on the top of the shape in the flat part of a dip between curves.

Curved side wall 1223 of base 1220 and side wall 1233 of cover 1230 form the heart shape's left and right boundaries as well as the places where the boundaries meet. A back wall 1222 of base 1220, surrounded by side wall 1223, has electrical receptacle holes 1212, 1214 and a central hole 1216 for mounting base 1020 to a wall 1240. Advantageously, the protruding three-dimensional shape of cover 1230 and the recess created by side walls 1223, 1233 of base 1220 and base 1230 can be dimensioned to allow electrical plugs to remain inserted into the electrical receptacles 1213, 1215 to which holes 1212, 1214 provide access.

The part of back wall 1222 around central hole 1216 may be thickened or otherwise reinforced to help ensure adequate structural strength for base 1220 and, when attached, cover 1230. Although that precaution can be implemented around any such mounting hole in an outlet cover's base, the additional structural strength afforded may be particularly desirable in device 1200 to handle potential strain from tension on any electrical cords terminating in plugs inside it and the weight of its three-dimensional shape.

In embodiments having a significant three-dimensional aspect, e.g., devices 100, 1200, the interior of the device can be kept empty and sized sufficiently to allow the cover to close fully even when ordinary electrical plugs are inserted in the receptacles of the outlet. To facilitate this goal, one or several notches can be placed into the cover or the base, or both, to create a hole suitable for passing electrical cords leading from the plug to pass through the device. For example, in device 1200, where there is substantial space between back wall 1232 of cover 1230 and back wall 1222 of base 1220, an electrical plug (not shown) can remain plugged into one of the covered receptacles 1213, 1215.

Figure 1:
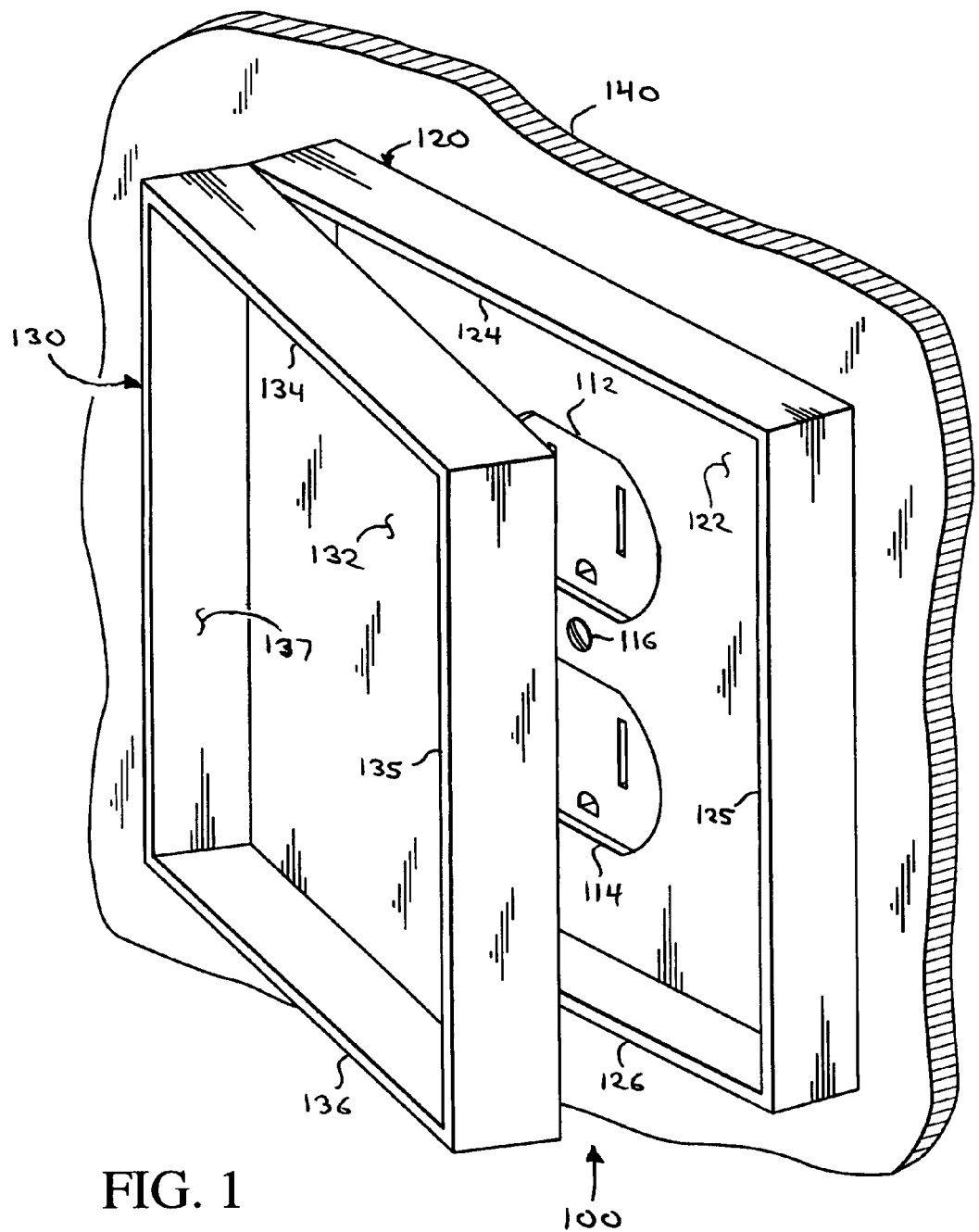
FIGS. 1-3 are perspective views of an outlet cover device configured to mount a standard ceramic tile according to various aspects of the present invention.

In FIGS. 5, 7, and 9, the respective covers contain three-dimensional design elements at different levels, forming a relief. In one embodiment, the relief can be bas relief forms. In variations, other figures can have tiles (e.g., FIG. 3) or cover designs (e.g., FIG. 13) that contain shapes formed in relief. The relief can be formed by molding the cover, carving or forming levels into a tile or insert placed in an outwardly facing tray like that shown in FIG. 1, or fastening separate pieces to the cover or a base tile.

PUBLIC NOTICE REGARDING THE SCOPE OF THE INVENTION AND CLAIMS

No one embodiment disclosed herein is essential to the practice of another unless indicated as such. Indeed, the invention, as supported by the disclosure above and in the originally filed claims, includes all systems and methods that can be practiced from all suitable combinations of the various aspects disclosed, and all suitable combinations of the exemplary elements listed. Such combinations have particular advantages, including advantages not specifically recited herein.

Alterations and permutations of the preferred embodiments and methods will become apparent to those skilled in the art upon a reading of the specification and a study of the drawings. In a variation of device 400, for example, cover flap 430 can be press-fitted against base 420 in the same way that cover 1230 press fits against base 1220 in device 1200. Conversely, a variation of device 1200 can include a floating hinge (not shown) that connects cover 1230 to base 1220 in a way that avoids interference between walls 1223, 1233 of the two structures when cover 1230 is in an open position.

Accordingly, none of the disclosure of the preferred embodiments and methods defines or constrains the invention. Rather, the issued claims variously define the invention. Each variation of the invention is limited only by the recited limitations of its respective claim, and equivalents thereof, without limitation by other terms not present in the claim. For example, claims that do not call for any particular visually distinctive decorative theme can have any such theme. As another example, claims that call for structure to support a tile but do not recite any particular size of tile read on structures that support the 4×4 inch and 6×6 inch tiles discussed above, as well as 5×5 inch tiles or any other dimensions that conform with some standard in the desired implementation. Indeed, the invention may be pointed out and distinctly claimed in a way that does not call for "standard" ceramic tile and is not limited to conformance with any standard at all.

In addition, aspects of the invention are particularly pointed out below using terminology that the inventor regards as having its broadest reasonable interpretation; the more specific interpretations of 35 U.S.C. § 112(6) are only intended in those instances where the terms "means" or "steps" are actually recited. The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. The conjunction "or" between alternative elements means "and/or," and thus does not imply that the elements are mutually exclusive unless context or a specific statement indicates otherwise.

What is claimed is:

1. Apparatus for decoratively concealing electrical receptacles, comprising:
   (a) a base structured to be fastened over an electrical outlet and having a plurality of holes for receptacles of the outlet and containing a first portion of a visual depiction; and
   (b) a cover coupleable to the base containing a second portion of the visual depiction, different from the first portion of the visual depiction;
   (c) wherein the first and second portions of the visual depiction together form a common decorative theme; and
   (d) the cover is openable away from the base to expose the receptacles, through the holes in the base, and closeable against the base to conceal the receptacles.

2. The apparatus of claim 1 wherein material of the base and material on the outside of the cover, when closed against each other, are substantially flat and parallel to each other but not substantially in the same plane.

3. The apparatus of claim 2 wherein the base has a substantially non-rectangular shape.

4. The apparatus of claim 3 wherein the first portion of the visual depiction surrounds the cover.

5. The apparatus of claim 1 wherein the base and the cover together form a substantially three-dimensional structure.

6. The apparatus of claim 1 wherein the base has a substantially non-rectangular shape.

7. The apparatus of claim 6 wherein the first portion of the visual depiction surrounds the cover.

8. The apparatus of claim 1 further comprising a hinge, wherein the cover is hingedly coupled to the base.

9. The apparatus of claim 1 wherein the cover is removably coupled to the base.

10. Apparatus for decoratively concealing electrical receptacles, comprising:
    (a) a base structured to be fastened over an electrical outlet and having a plurality of holes for receptacles of the outlet and containing a first portion of a visual depiction;
    (b) a cover coupleable to the base containing a second portion of the visual depiction, different from the first portion of the visual depiction; and
    (c) a hinge connecting the cover to the base;
    (d) wherein the first and second portions of the visual depiction together form a common decorative theme.

11. The apparatus of claim 10 wherein the first portion of the visual depiction surrounds the cover.

12. The apparatus of claim 10 wherein the base has a substantially non-rectangular shape.

13. Apparatus for decoratively concealing electrical receptacles, comprising:
    (a) a base structured to be fastened over a standard electrical outlet and including a plurality of holes for receptacles of the outlet; and
    (b) a cover coupleable to the base;
    (c) wherein the base and cover each have decorative features that are different portions of a visual depiction and together establish a common decorative theme that is visually distinctive from the electrical outlet; and
    (d) the cover is openable away from the base to expose the receptacles, through the holes in the base, and closeable against the base to conceal the receptacles.

14. The apparatus of claim 13 wherein material of the base and material on the outside of the cover, when closed against each other, are substantially flat and parallel to each other but not substantially in the same plane.

15. The apparatus of claim 14 wherein the base has a substantially non-rectangular shape.

16. The apparatus of claim 15 wherein the first portion of the visual depiction surrounds the cover.

17. The apparatus of claim 13 wherein the base and the cover together form a substantially three-dimensional structure.

18. The apparatus of claim 17 wherein the decorative features of the base surround the cover.

19. The apparatus of claim 13 wherein the base has a substantially non-rectangular shape.

20. The apparatus of claim 19 wherein the decorative features of the base surround the cover.

21. The apparatus of claim 13 further comprising a hinge, wherein the cover is hingedly coupled to the base.

22. The apparatus of claim 13 wherein the cover is removably coupled to the base.

23. Apparatus for decoratively concealing electrical receptacles, comprising:
   (a) a base structured to be fastened over a standard electrical outlet and including a plurality of holes for receptacles of the outlet; and
   (b) a cover coupleable to the base; and
   (c) a hinge connecting the cover to the base;
   (d) wherein the base and cover each have decorative features that are different portions of a visual depiction and together establish a common decorative theme that is visually distinctive from the electrical outlet.

24. The apparatus of claim 23 wherein the base has a substantially non-rectangular shape.

25. The apparatus of claim 24 wherein the decorative features of the base surround the cover.

* * * * *